3,365,303
PREPARATION OF BLUE CHEESE BY ADDING TO THE CHEESE MILK A BLUE CHEESE MOLD AND RIPENING THE CURD IN A DIVIDED CONDITION
Theodore I. Hedrick, East Lansing, Mich., Erland Kondrup, Toledo, Ohio, and Wayne T. Williamson, Waukegan, Ill., assignors to Research Corporation, New York, N.Y., a non-profit corporation of New York
No Drawing. Continuation-in-part of application Ser. No. 409,309, Nov. 5, 1964. This application Apr. 18, 1967, Ser. No. 631,588
6 Claims. (Cl. 99—116)

ABSTRACT OF THE DISCLOSURE

Blue cheese is made by adding to milk, including filled, enriched and reconstituted milk, a blue cheese mold prior to curd formation, dividing the curd when formed into small pieces and maintaining the curd in a divided condition until the cheese is fully ripened. A lactic acid forming organism and rennet may be added to the milk with the blue cheese mold and the divided curd may be periodically salted and stirred during the ripening of the cheese.

---

This application is a continuation-in-part of our application Ser. No. 409,409, filed Nov. 5, 1964, now abandoned.

This invention relates to the preparation of blue cheese. In one particular aspect, the present invention relates to an improved method for curing blue cheese.

Roquefort or blue-type cheese is an important cheese variety with wide public acceptance. Such cheese is customarily made by adding a culture of a lactic acid producing organism and rennet to milk. The combination of acid formation and enzymatic action causes the protein present in the milk to coagulate together with certain other milk solids. The resultant curd is separated and salted and inoculated with a suitable blue cheese forming mold strain such as *Penicillium roquefortii*. The inoculation is usually accomplished by sprinkling the curd with mold powder or otherwise adding the powder to the curd. The inoculated curd is then hooped, that is, pressed into wheels which are further salted, and set aside to cure or ripen which takes about three months. An undesirable slime grows on the cheese during the lengthy ripening period.

It is an object of the present invention to provide an improved and more economical method for the preparation of blue cheese.

It is a further object of this invention to provide a method which accelerates the ripening of blue cheese.

It is a further object of the present invention to shorten the time required to make blue cheese without sacrificing the flavor, body or texture of the resultant cheese.

It is still another object of this invention to provide a method for the preparation of blue cheese which minimizes slime formation during the ripening period.

It is yet another object of the present invention to provide a method for the preparation of blue cheese which avoids hooping and pressing of the curd prior to ripening of the cheese.

We have discovered that these and other desirable objectives can be achieved by inoculating the milk with the blue cheese forming mold prior to curd formation and by ripening the cheese as small pieces or chunks. Incorporation of these steps into the conventional procedure for the preparation of blue cheese results in a shortening of the usual three month curing period to one of six to fourteen days. Such a shortened ripening period minimizes slime growth during the ripening period.

Other advantages of making blue cheese according to the present invention are that it results in a more uniform distribution of the mold throughout the cheese giving rise to a more uniform product. Instead of hooping and pressing the cheese into wheels weighing 5 or 6 pounds as was previously done, the curd is maintained in small pieces which expedites salting and helps accelerate the curing. The present process avoids the prior art practice wherein the wheels, which were approximately 7.5 inches in diameter and 6 inches high, were punctured to provide and maintain small openings in the cheese in an attempt to promote ripening of the cheese.

Accordingly, our method for the preparation of blue cheese includes the following steps: adding a cheese starter containing a lactic acid forming organism, a blue cheese forming mold and rennet to milk; dividing the resultant curd into small pieces; separating the divided curd from the whey; and periodically salting and stirring the divided curd until ripening of the cheese is complete.

The process of our invention is further illustrated by the following discussion:

Regularly pasteurized and homogenized milk is usually utilized in the preparation of blue cheese intended for interstate use. However, raw milk, milk subject to subpasteurization conditions of time and/or temperature or milk subject to minimal pasteurization times and/or temperatures may also be employed in the making of a satisfactory blue cheese. Moreover, the cheese itself may be pasteurized during the course of its processing or in the course of manufacturing cheese products such as cheese spreads, salad dressings and the like.

A suitable pasteurization procedure which complies with Federal requirements is one in which the milk is heated at 130° F., homogenized in the usual way at 750 to 3500 p.s.i.g. and then held for 30 minutes at 143° F. In an alternate variation, only the cream is homogenized and the milk reconstituted to a butterfat content of about 3.5% prior to the completion of pasteurization. Such pasteurization conditions do not completely destroy the milk lipases and the final flavor of the product cheese is not adversely affected. While not necessary under these conditions, additional lipase could be added to the milk. Under conditions in which more of the milk lipase is destroyed, the addition of further lipase is desirable.

The preferred order of addition of blue cheese making ingredients to the milk is as follows: cheese starter, decolorizer, cheese forming mold and rennet. This order of addition is not critical to the successful preparation of blue cheese according to the method of the present invention. However, it is necessary that the milk be inoculated with the mold culture prior to curd formation. It may often be convenient to add these ingredients to the milk at the same time and even in admixture with each other.

The starter, which is generally added first, may be any conventional cheese starter used in the preparation of blue cheese. Such a starter contains a culture of a lactic acid forming micro-organism usually of the genus Streptococcus. One well known starter organism is *Streptococcus lactis*; but a mixture of *S. lactis* with *S. diacetylactis*, *S. cremoris* and *Leuconostoc cremoris* is preferred. A suitable starter solution is customarily prepared by incubating pasteurized skim milk with a culture of the starter organism.

The use of a decolorizer, such as chlorophyl in the form of its dilute aqueous solution, while not essential to the preparation of a satisfactory cheese, is preferred. Other conventional decolorizers are benzoyl chloride, benzoyl peroxide and other peroxides.

The milk may be inoculated with the mold forming organism in any conventional manner. However, it is most convenient to use a commercially available mold powder. The particular mold employed is *Penicillium roquefortii*. It should be noted that there are many strains of this microorganism employed in blue cheese making.

Any satisfactory rennet may be utilized. The commercially available rennet solution is further diluted with water prior to its addition to the milk. Rennet contains the enzyme primarily responsible for curd formation.

When the acidity of the whey reaches about 0.11–0.12%, the curd which has formed is cut into smaller pieces about ¼ to 1 inch in size. The cut curd is then gently stirred with the whey for a period of time usually about 60 to 90 minutes. The curd is then drained in the usual way to separate the whey. Curing or ripening of the curd is effected under aerobic conditions in a curing room. Such a room should be at a temperature between 50° and 75° F. and at a relative humidity about 95%. The room should be equipped with perforated shelves on which the cheese to be ripened is placed. Salt in the form of solid or as an aqueous brine is added periodically to the ripening cheese and the cheese is stirred periodically. It is critical to the success of the present process that the curing cheese be stirred so as to prevent matting of the curd and to maintain it in a divided condition.

The pH of the curd varies somewhat during the curing period. It is preferred that the curd be at a pH between 5.7 and 5.9 in the latter stages of the ripening process. A satisfactory cheese will result as long as the pH remains between 5.5 and 6.1. If the pH falls too low, the flavor of the cheese will not be satisfactory; if the pH is too high, a longer curing period will be required. The addition of salt has as a tendency to lower the pH of the ripening cheese and some care must be exercised in the manner in which the salt is added.

The fully ripened divided product may be formed into larger lumps by pressure with or without prior granulation. The product may be emulsified and processed to a powder for sale as such or for use in the manufacture of cheese spreads or salad dressings. The product or the powder may be mixed with milk or with skim milk and/or cream in consumer product formulation.

The following non-limiting example illustrates a preferred embodiment of the process of the present invention:

One thousand pounds of pasteurized and homogenized milk containing 3.6% of butterfat is brought to about 85° F. and about ½% by weight of starter solution is added to the milk. Preparation of the starter solution using mixed microorganisms has been described above. About one hour later, 35 milliliters of chlorophyl decolorizer, 116 grams of active *P. roquefortii* mold powder and 60 milliliters of diluted rennet solution are added to the milk with thorough mixing. When the acidity of the whey reaches 0.11–0.12%, the curd is cut into ¼–1 inch cubes and stirred gently with the whey. About 90 minutes after cutting of the curd, it is drained to separate the whey.

The cut and drained curd is placed in a curing room held at about 62° F. and having a relative humidity of 95%. The curd is stirred 2 or 3 times the first 24 hours in the curing room and once or twice daily thereafter until ripening of the cheese is complete. About 2 pounds of salt is added in portions during the 10-day curing period, for example, one-fourth on the fourth day, one-fourth on the fifth day and one-half on the sixth day. The fully ripened cheese is stored under refrigeration at about 32° to 45° F. to maintain its flavor and prevent spoilage.

A panel of experienced tasters rated the flavor and body of the cheese made by the above-described method in comparison with control cheeses made by conventional commercial methods. Results with various experimental batches showed the blue cheese made by the short cure method was as good as or better than the control blue cheese. When these cheese samples were incorporated into a salad dressing, the taste judges preferred those dressings made from the short cured blue cheese.

The procedures described above may also be applied to filled milks, that is, skim milk to which one or more vegetable fats having a melting point similar to that of milk fat has been added, to enriched whole milk, that is, whole milk to which such vegetable fats have been added, and to reconstituted milk, that is, milk products obtained by mixing concentrated milk and/or powdered skim milk with such vegetable fats and water, all of which products are well known in the art. The term milk as used in the claims hereof is intended to include such filled, enriched and reconstituted milks.

We claim:

1. A process for making blue cheese which comprises adding to milk a cheese starter containing a lactic acid forming organism, a blue cheese forming mold, a rennet; dividing the resultant curd into small pieces; separating the curd from the whey; and periodically salting and stirring the divided curd until ripening of the cheese is complete.

2. A process for making blue cheese which comprises adding to milk a cheese starter containing a lactic acid forming organism, *Penicillium roquefortii*, and rennet; dividing the resultant curd into one-fourth to one inch pieces; separating the curd from the whey; and periodically salting and stirring the divided curd until ripening of the cheese is complete.

3. A process according to claim 2 wherein a decolorizer is added to the milk.

4. A process according to claim 3 wherein the decolorizer is chlorophyl.

5. A process according to claim 2 wherein the milk is homogenized and pasteurized.

6. The improvement in the preparation of blue cheese which comprises adding blue cheese mold to milk prior to curd formation, dividing the curd when formed into small pieces and maintaining the curd in a divided condition until the cheese is fully ripened.

References Cited

UNITED STATES PATENTS

| | | | |
|---|---|---|---|
| 770,030 | 9/1904 | Trillat | 99—116 |
| 2,227,748 | 1/1941 | Golding | 99—115 |
| 2,560,182 | 7/1951 | Nelson et al. | 99—116 |
| 3,156,568 | 11/1964 | Hargrove et al. | 99—116 |

OTHER REFERENCES

Kuramoto, S.: Some Factor Affecting the Action of Benzoyl Peroxide in the Bleaching of Milk and Cream for Blue Cheese Manufacture. J. Dairy Sci., 1954, vol. 37 (pp. 1241–1246).

A. LOUIS MONACELL, *Primary Examiner.*

D. M. NAFF, *Assistant Examiner.*